United States Patent
Matsubara

(10) Patent No.: US 10,132,266 B2
(45) Date of Patent: Nov. 20, 2018

(54) INTERNAL COMBUSTION ENGINE WITH FUEL INJECTION VALVE AND CONTROLLER FOR FUEL INJECTION CONTROL

(71) Applicant: TOYOTA JIDOSHA KABUSHIKI KAISHA, Toyota-shi, Aichi-ken (JP)

(72) Inventor: Naoyoshi Matsubara, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 120 days.

(21) Appl. No.: 14/992,120

(22) Filed: Jan. 11, 2016

(65) Prior Publication Data

US 2016/0201594 A1  Jul. 14, 2016

(30) Foreign Application Priority Data

Jan. 14, 2015  (JP) .................. 2015-005318

(51) Int. Cl.
*F02D 41/40* (2006.01)
*F02D 41/38* (2006.01)
*F02D 41/20* (2006.01)

(52) U.S. Cl.
CPC ........... *F02D 41/402* (2013.01); *F02D 41/38* (2013.01); *F02D 41/20* (2013.01); *F02D 2041/389* (2013.01); *F02D 2200/0602* (2013.01); *Y02T 10/44* (2013.01)

(58) Field of Classification Search
CPC ........ F02D 41/402–41/405; F02D 2200/0602; F02D 2200/0618
USPC .................. 123/299; 701/103–105
See application file for complete search history.

(56) References Cited

U.S. PATENT DOCUMENTS

| | | | | |
|---|---|---|---|---|
| 5,176,122 A * | 1/1993 | Ito | ....................... | F02D 41/2438 123/447 |
| 6,142,121 A * | 11/2000 | Nishimura | ............ | F02D 41/008 123/447 |
| 6,732,715 B2 * | 5/2004 | Fallahi | .................... | F02D 41/20 123/478 |

(Continued)

FOREIGN PATENT DOCUMENTS

JP  H04-203441 A  7/1992
JP  10-259753  9/1998

(Continued)

*Primary Examiner* — Erick Solis
*Assistant Examiner* — Robert Werner
(74) *Attorney, Agent, or Firm* — Finnegan, Henderson, Farabow, Garrett & Dunner, LLP

(57) ABSTRACT

A controller is provided that performs first injection that executes fuel injection with lower injection rate and subsequently performs second injection with higher injection rate. The controller configured to determine a target value for fuel pressure drop amount or difference between pressure of fuel within a fuel injection valve at starting point of the first injection and pressure of fuel within the fuel injection valve while the first injection is performed, and stop supply of command signal to the fuel injection valve once fuel pressure drop amount in the first injection becomes greater than target value for the fuel pressure drop amount, and supply command signal once the fuel pressure drop amount in the first injection becomes smaller than the target value for the fuel pressure drop amount.

3 Claims, 12 Drawing Sheets

(56) References Cited

U.S. PATENT DOCUMENTS

| | | | |
|---|---|---|---|
| 6,796,290 B2 * | 9/2004 | Boehland | F02M 45/02 |
| | | | 123/299 |
| 6,904,893 B2 * | 6/2005 | Hotta | F02D 41/3836 |
| | | | 123/299 |
| 7,886,719 B2 * | 2/2011 | Thomas | F02D 41/402 |
| | | | 123/299 |
| 8,543,314 B2 * | 9/2013 | Nakata | F02D 41/2096 |
| | | | 123/456 |
| 2006/0102154 A1 | 5/2006 | Ricco et al. | |
| 2006/0231077 A1 | 10/2006 | Ricco et al. | |
| 2009/0063016 A1 * | 3/2009 | Nakata | F02D 41/2096 |
| | | | 701/103 |

FOREIGN PATENT DOCUMENTS

| | | |
|---|---|---|
| JP | 2006-138310 | 6/2006 |
| JP | 2009-57925 | 3/2009 |
| JP | 2012-189061 A | 10/2012 |
| JP | 2013-68204 | 4/2013 |
| JP | 2013-209948 | 10/2013 |
| JP | 2014-163260 A | 9/2014 |

\* cited by examiner

[Fig. 1]
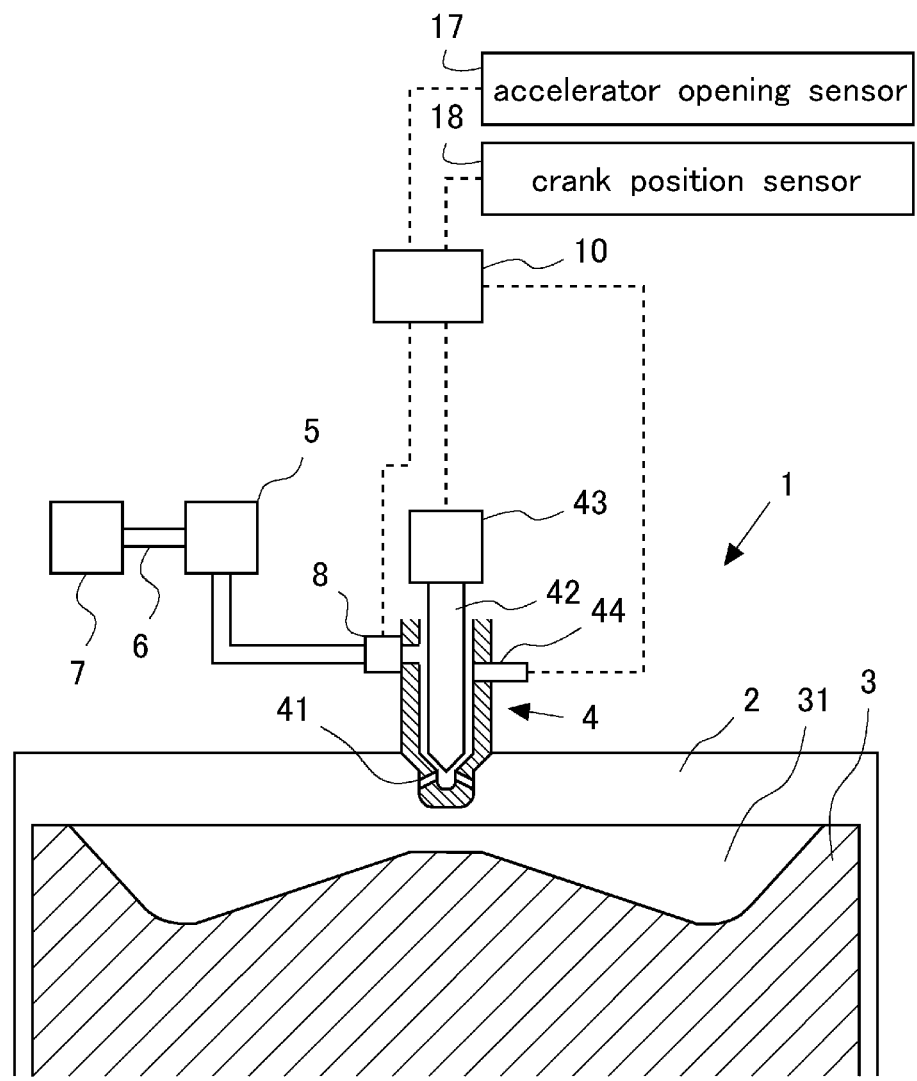

[Fig. 2]
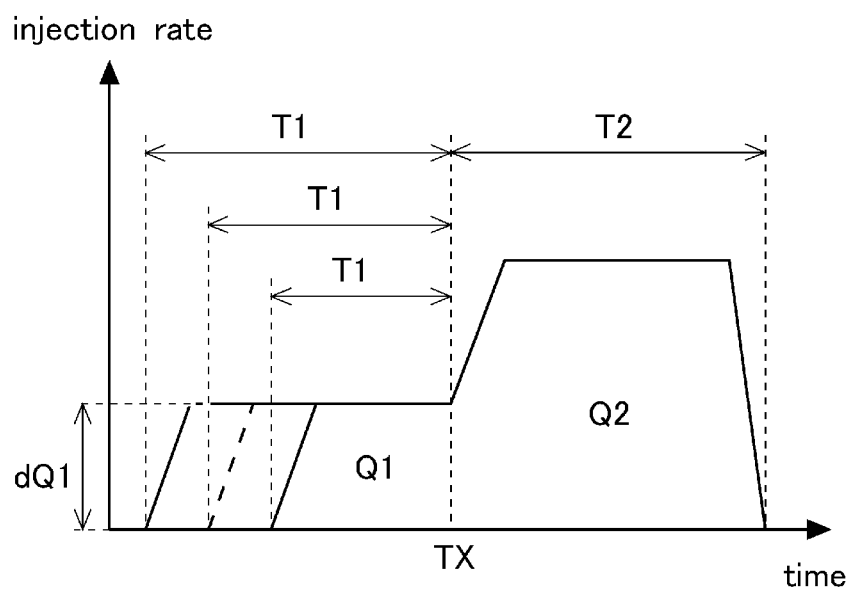

[Fig. 3]
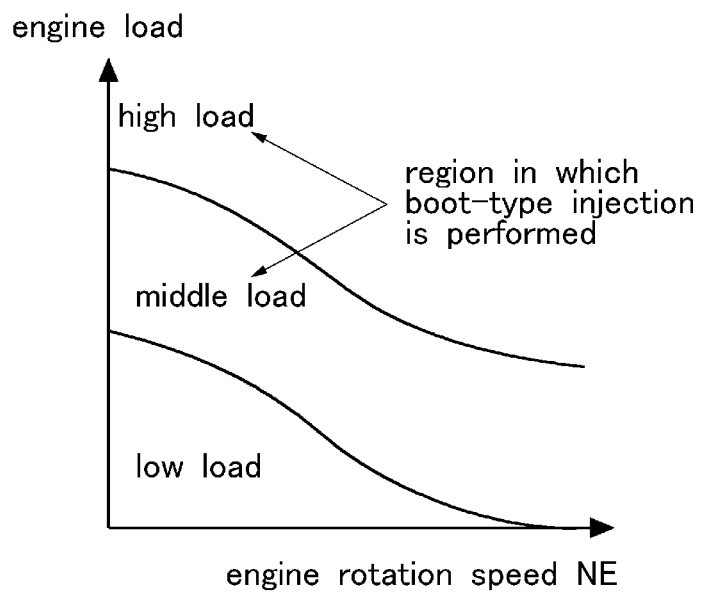

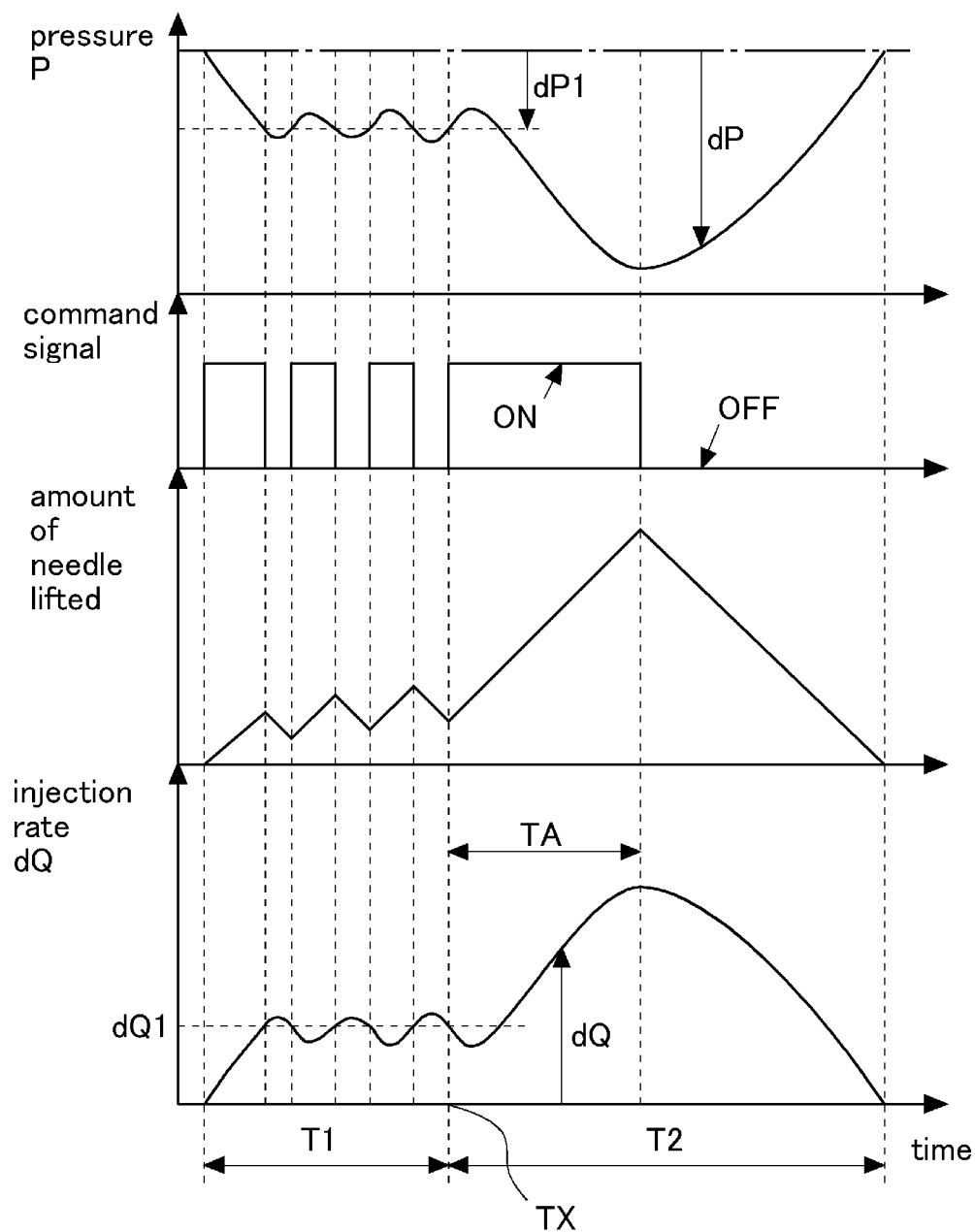
[Fig. 4]

[Fig. 5]
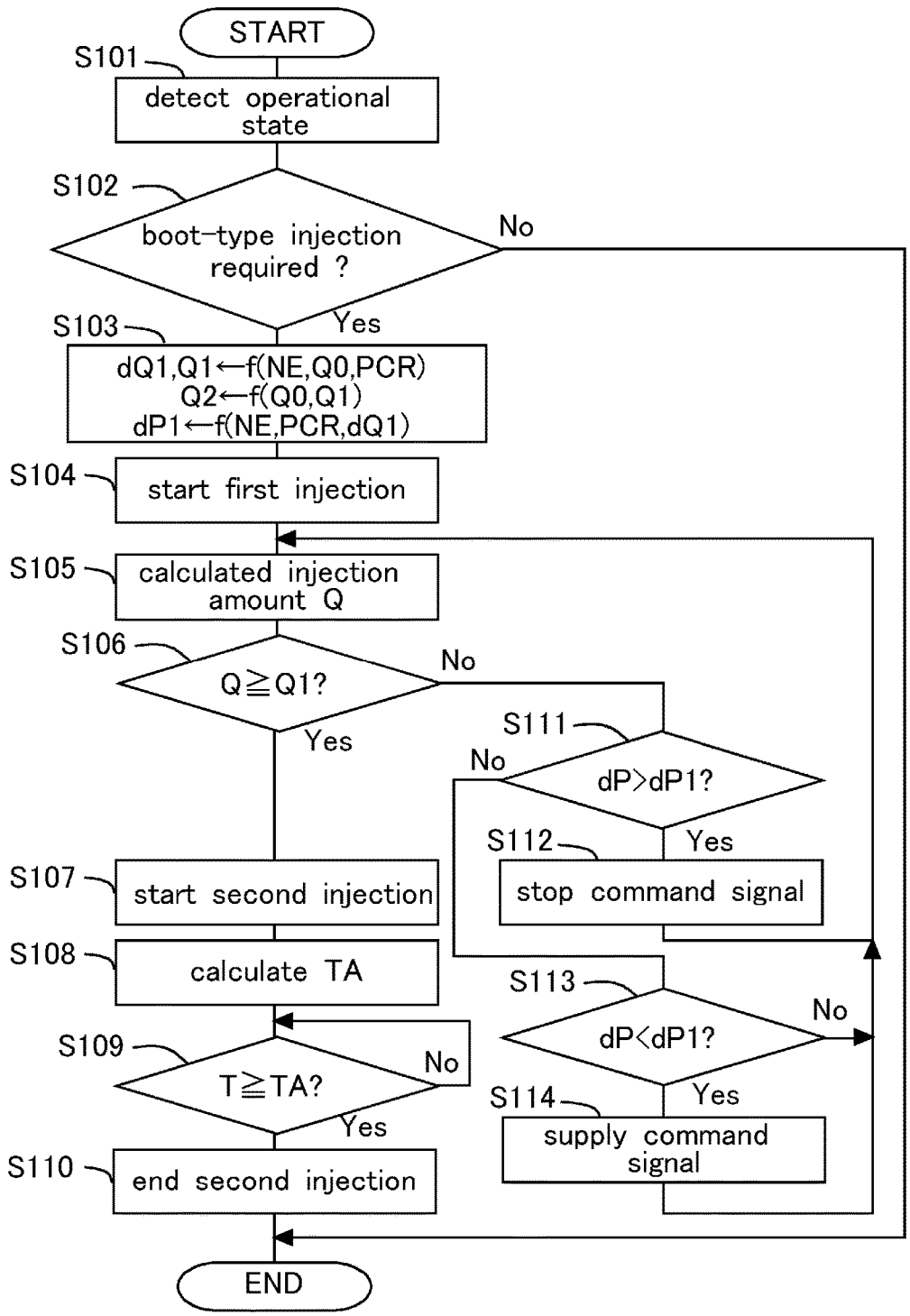

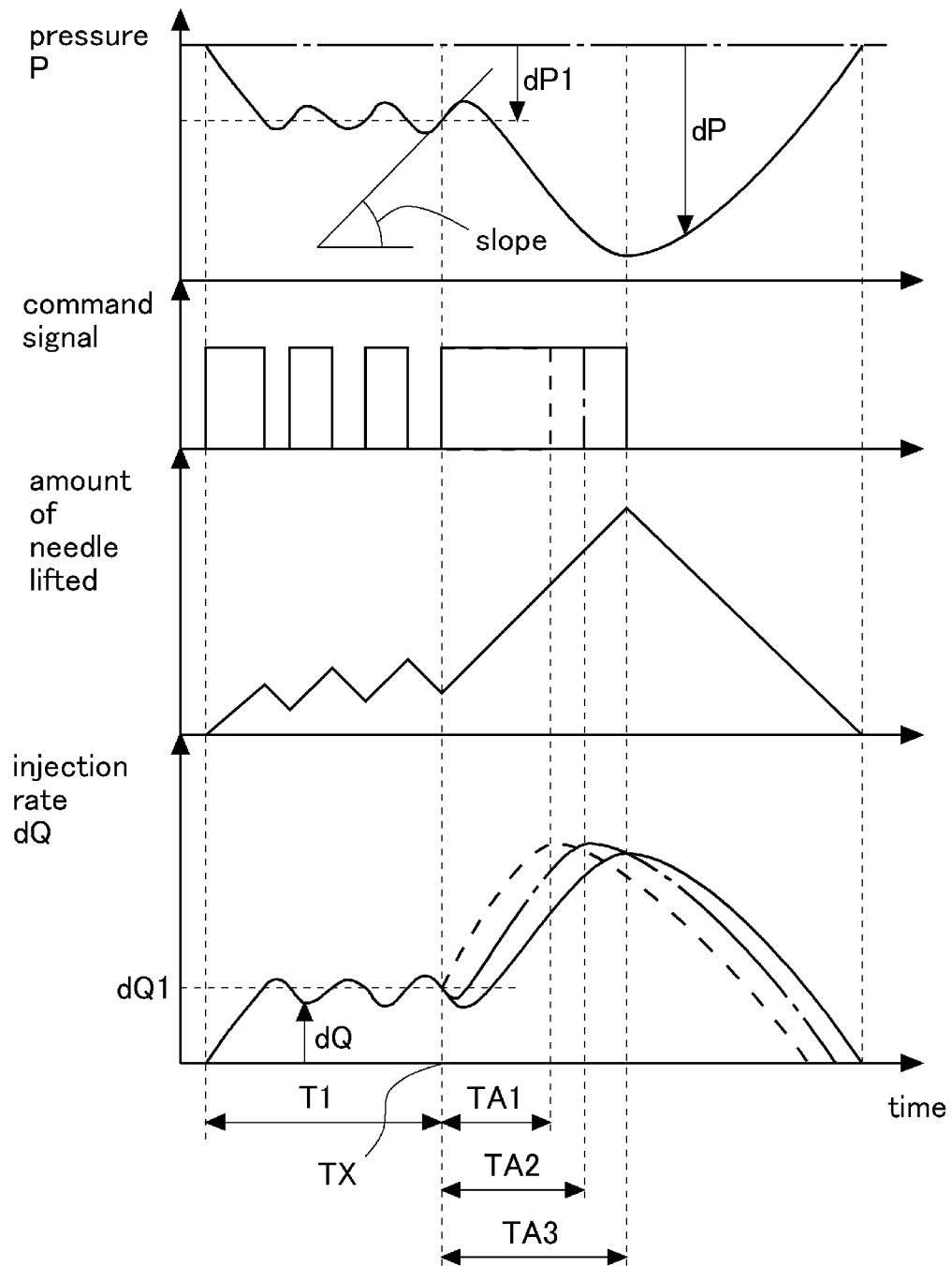
[Fig. 6]

[Fig. 7]
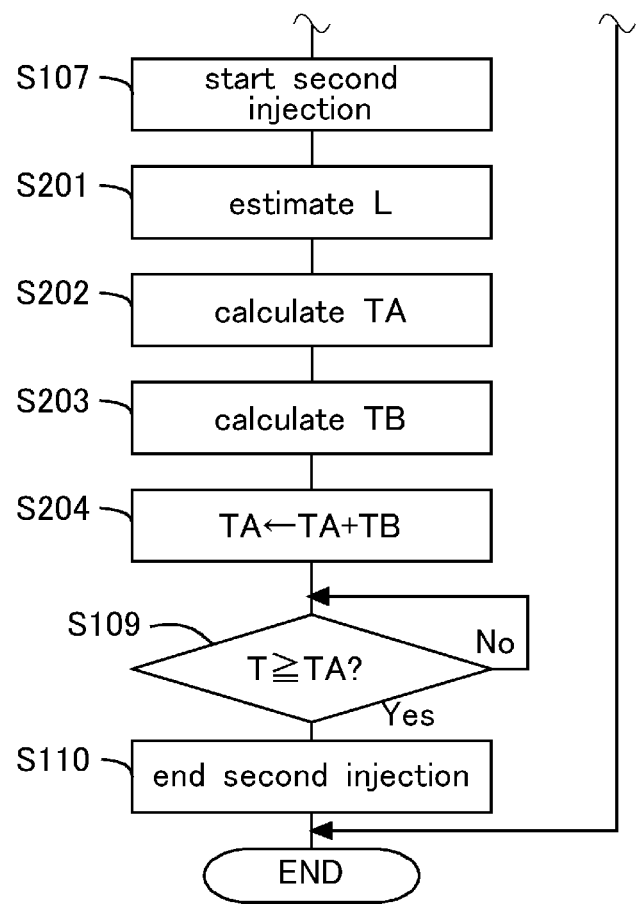

[Fig. 8]
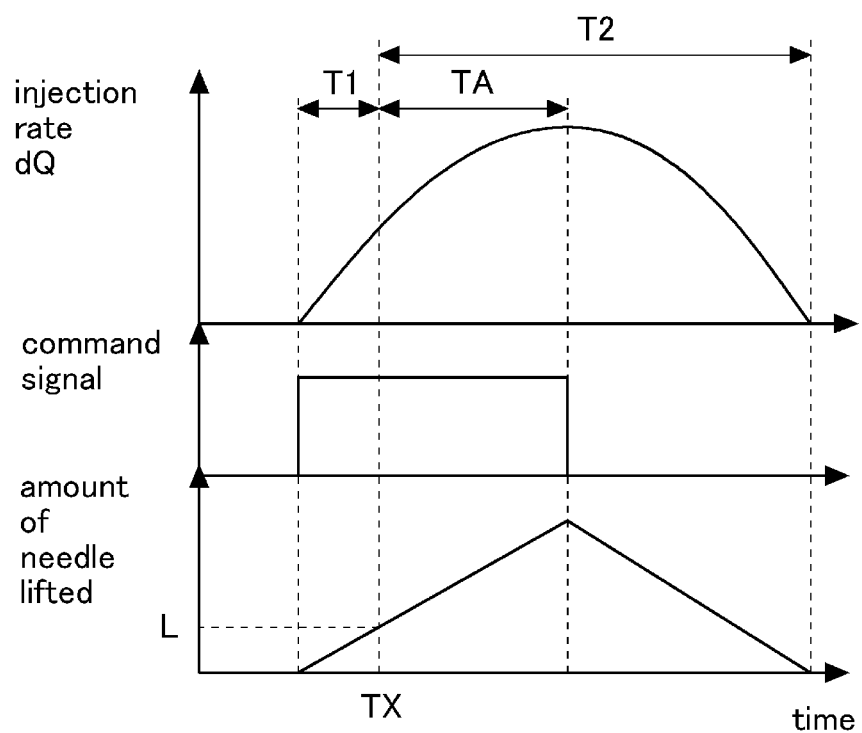

[Fig. 9]
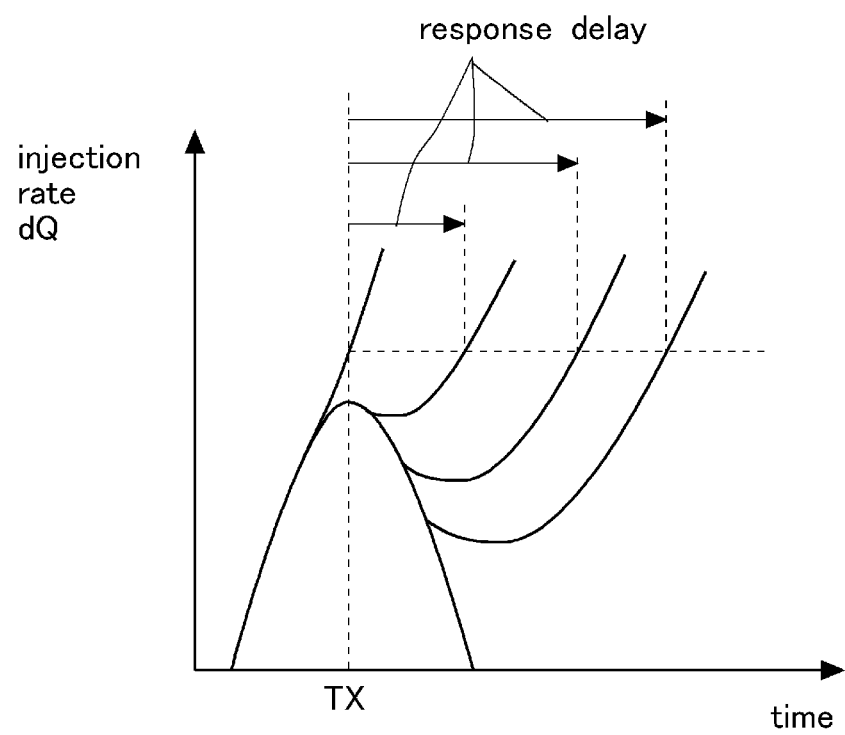

[Fig. 10]
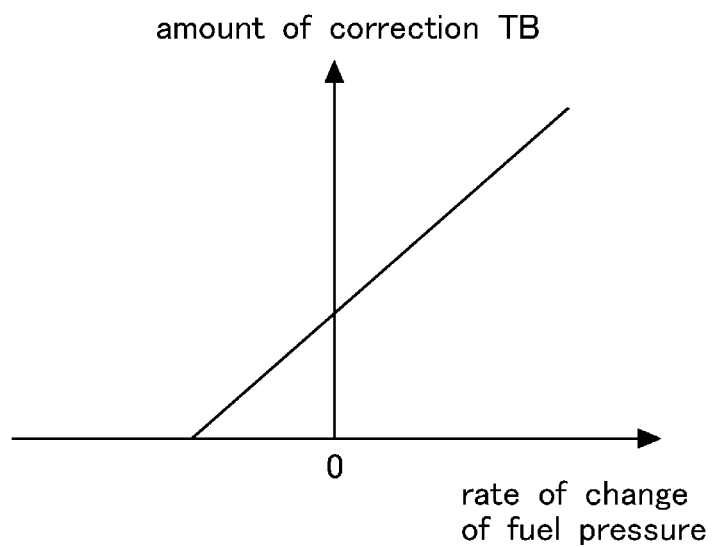

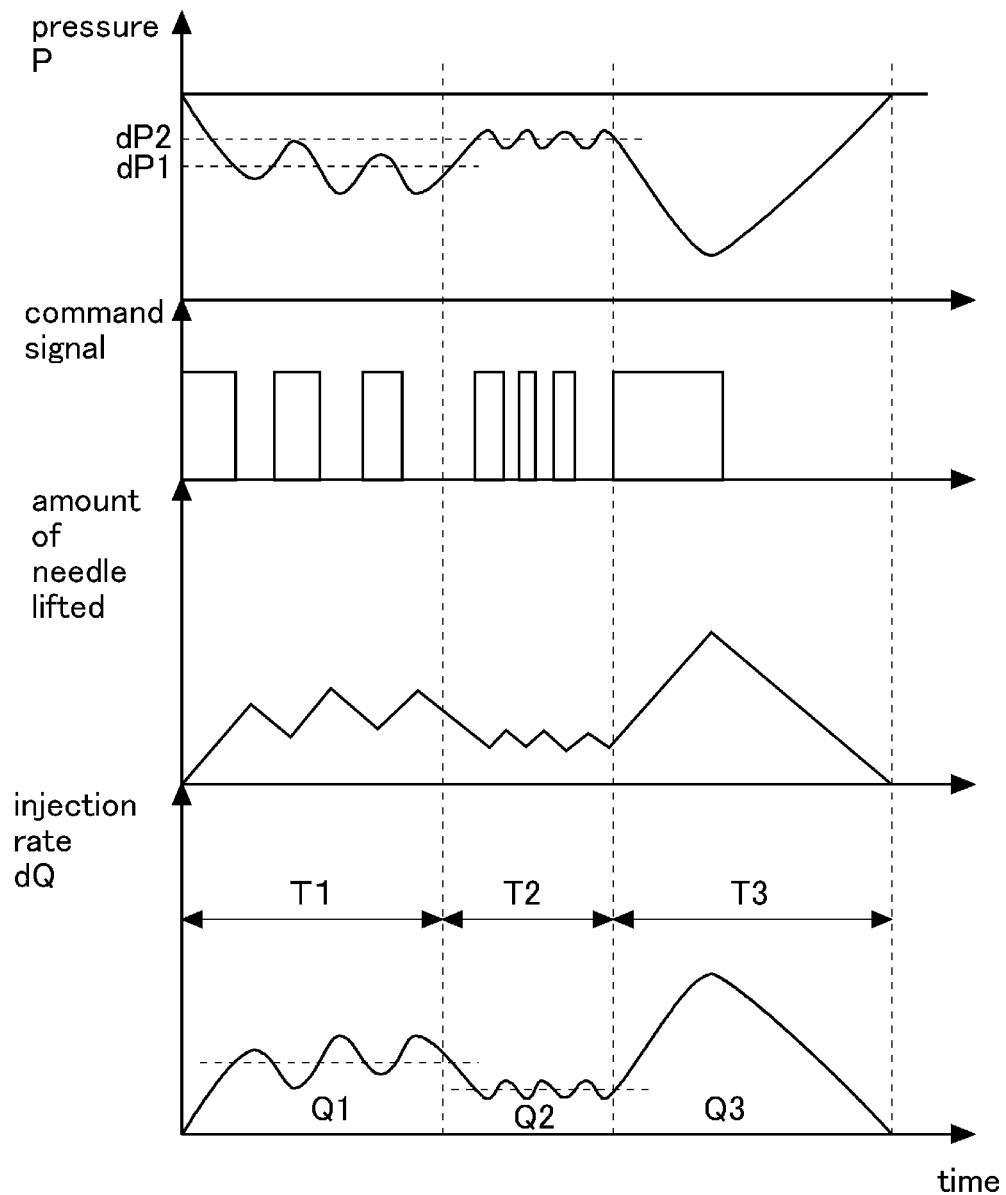
[Fig. 11]

[Fig. 12]
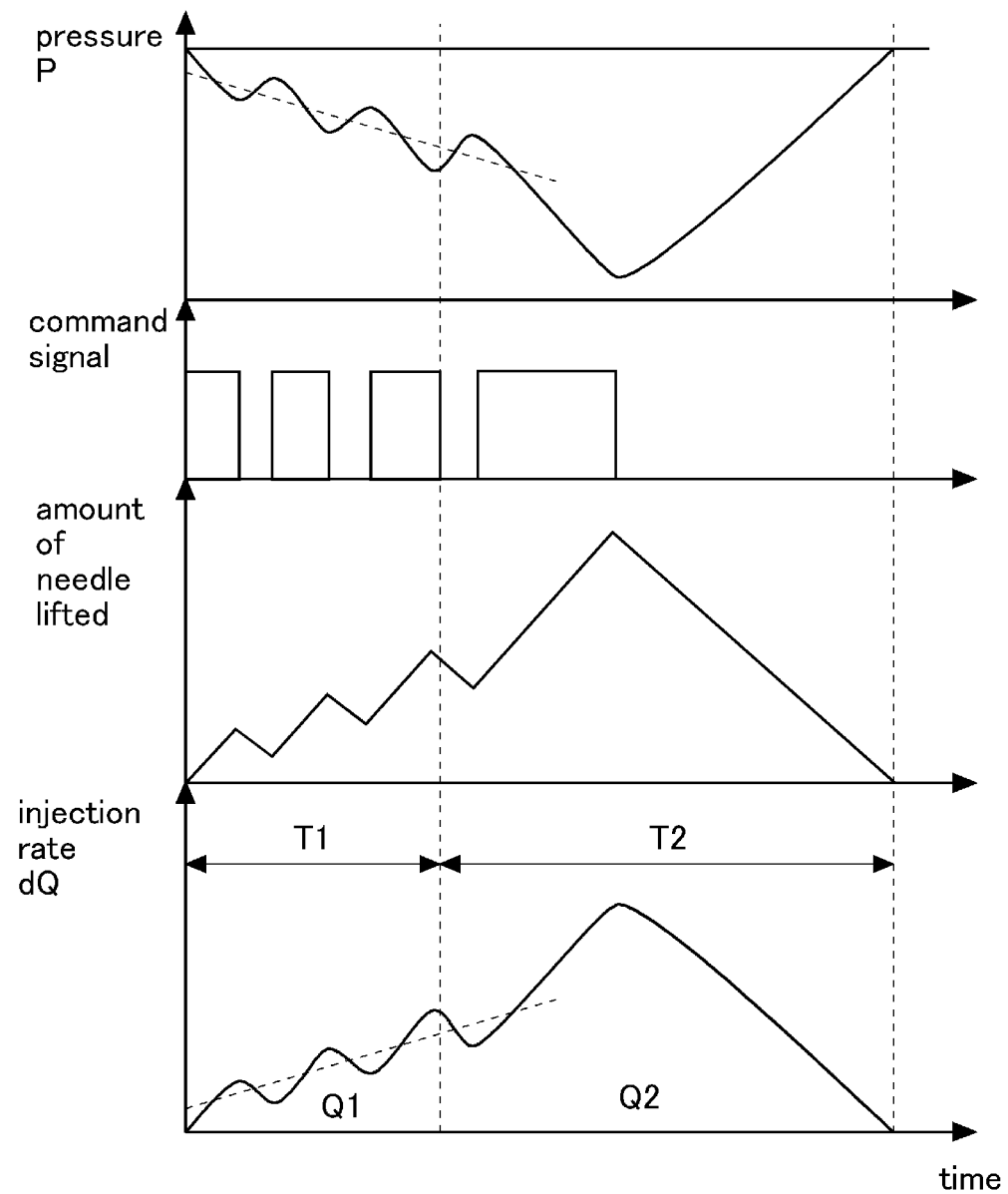

INTERNAL COMBUSTION ENGINE WITH FUEL INJECTION VALVE AND CONTROLLER FOR FUEL INJECTION CONTROL

CROSS REFERENCE TO RELATED APPLICATIONS

This application claims priority to Japanese Patent Application No. 2015-005318 filed on Jan. 14, 2015, the entire contents of which are incorporated by reference herein.

BACKGROUND OF THE INVENTION

Field of the Invention

The present invention relates to an internal combustion engine.

Description of the Related Art

In diesel engines, so-called boot-type injection is known in which fuel injection is executed with lowered injection rate and subsequently another fuel injection is executed with elevated injection rate. By executing this boot-type injection, burst combustion of fuel can be prevented, and thereby generation of NOx can be reduced and combustion noise can be restrained. In this regard, a technique is known that executes fuel injection in a continuous manner by, during execution of fuel injection with low injection rate in the boot-type injection, moving a needle up or down through intermittent supply of command signal to a fuel injection valve and moving the needle up before it is moved down to the full extent (that is, before the valve is closed) (see Patent Document 1, for example).

PRIOR ART DOCUMENT

Patent Document

[Patent Document 1] Japanese Unexamined Patent Application Publication No. 2006-138310
[Patent Document 2] Japanese Unexamined Patent Application Publication No. H10-259753
[Patent Document 3] Japanese Unexamined Patent Application Publication No. 2013-068204
[Patent Document 4] Japanese Unexamined Patent Application Publication No. 2013-209948
[Patent Document 5] Japanese Unexamined Patent Application Publication No. 2009-057925

SUMMARY OF THE INVENTION

Problem to be Solved by the Invention

In the conventional technique as mentioned above, controls are performed by relating amount of lift of the needle with the command signal. Therefore, if speed of the needle is variable with respect to the command signal, injection rate of fuel will also show variation. This may possibly result in excess or deficiency in amount of fuel injection.

The present invention is proposed in light of the above-mentioned problem, and its purpose is to prevent excess or deficiency in fuel injection amount during execution of so-called boot-type injection in which fuel injection is executed with lowered injection rate and subsequently another fuel injection is executed with elevated injection rate.

Means for Solving the Problem

In order to solve the above-mentioned problem, an internal combustion engine in accordance with the present invention comprises: a fuel injection valve in which, in response to supply of command signal, a needle is urged in a valve-opening direction and thereby cross-sectional area of a fuel passage is expanded and injection rate of fuel is increased according to amount of lift of the needle, the fuel injection valve having a sensor for detecting pressure of fuel within the fuel injection valve; a controller comprising at least one processor configured to supply the command signal to the fuel injection valve, the controller comprising at least one processor configured to perform first injection that executes fuel injection from the fuel injection valve and subsequently comprising at least one processor configured to perform second injection that executes fuel injection from the fuel injection valve with injection rate higher than that in the first injection; and an operational state detector configured to detect operational state of the internal combustion engine, wherein the controller comprising at least one processor configured to determine, based on the operational state of the internal combustion engine detected by the operational state detector, a target value for fuel pressure drop amount or difference between the pressure of fuel detected by the sensor at starting point of the first injection and the pressure of fuel detected by the sensor while the first injection is performed, and during execution of the first injection, stop supply of the command signal to the fuel injection valve once the fuel pressure drop amount becomes greater than the target value for the fuel pressure drop amount, and supply the command signal once the fuel pressure drop amount becomes smaller than the target value for the fuel pressure drop amount.

By performing the second injection subsequently to performing the first injection, the so-called boot-type injection can be executed in which fuel injection is executed with lowered injection rate and subsequently another fuel injection is executed with elevated injection rate. Note that the injection rate of fuel is an amount of fuel injection per unit time. If the needle is moved up in the fuel injection valve, the cross-sectional area of the passage through which fuel is flowed within the fuel injection valve is expanded and thus the amount of fuel to be passed is increased. This leads to a rise in the injection rate of fuel. Along with the rise in the injection rate of fuel, the pressure of fuel within the fuel injection valve drops. Therefore, there is a correlation between the fuel pressure drop amount and the injection rate. For this reason, there exists a fuel pressure drop amount at which the injection rate becomes a desired rate, and it is this fuel pressure drop amount that is set as the target value for the fuel pressure drop amount. By supplying the command signal to the fuel injection valve in such a way that brings the fuel pressure drop amount closer to its target value, the actual injection rate can be brought closer to the desired injection rate.

By stopping the supply of the command signal to the fuel injection valve, the needle is moved down. As a result, the cross-sectional area of the fuel passage is reduced and the injection rate is decreased, as well as the pressure of fuel is elevated, so that the fuel pressure drop amount is decreased. Therefore, in the event that the fuel pressure drop amount became greater than its target value, stopping the supply of the command signal to the fuel injection valve results in elevation in the fuel pressure and thereby the fuel pressure drop amount is decreased. This can bring fuel pressure drop amount closer to its target value, so that the injection rate can also be brought closer to the desired injection rate. To the contrary, in the event that the fuel pressure drop amount became smaller than its target value, supplying the command signal results in drop in the fuel pressure and thereby the fuel pressure drop amount is increased. This can bring the fuel pressure drop amount closer to its target value, so that the injection rate can also be brought closer to the desired injection rate. Therefore, the injection rate can be regulated with precision while the first injection is being performed. In this way, the injection rate can be regulated with precision while the first injection that is a part of the boot-type injection is being performed, so that excess or deficiency in the fuel injection amount can be prevented in that part of the boot-type injection. It is thus possible to prevent excess or deficiency in the fuel injection amount in the entire boot-type injection as well.

In addition, the controller may set a target value for first total injection amount or total amount of fuel injection in the first injection, based on the operational state of the internal combustion engine detected by the operational state detector, calculate the injection rate of fuel based on the fuel pressure drop amount while the first injection is being performed, calculate the first total injection amount since the starting point of the first injection by integrating the injection rate, and shift the process from the first injection to the second injection once the first total injection amount reaches the target value for the first total injection amount.

Since the injection rate is an amount of fuel injection per unit time, the first total injection amount since the start of the first injection can be calculated by integrating the injection rate. The first total injection amount can also be calculated based on integrated value of the fuel pressure drop amount that is in correlation with the injection rate. In this way, the first total injection amount in the first injection can be calculated easily, so that timing to end the first injection can also be known easily.

In addition, the controller may set a target value for second total injection amount or total amount of fuel injection in the second injection, based on the operational state of the internal combustion engine detected by the operational state detector, and calculate duration to supply the command signal to the fuel injection valve in the second injection, based on the amount of lift of the needle at endpoint of the first injection, the target value for the second total injection amount in the second injection, and rate of change of the pressure of fuel at the endpoint of the first injection that is calculated based on the pressure of fuel detected by the sensor.

In this regard, the amount of lift of the needle at the endpoint of the first injection, that is, the amount of lift of the needle at starting point of the second injection, is related with the injection rate of fuel thereafter. For this reason, how the injection rate may transition thereafter can be estimated according to the amount of lift of the needle at the endpoint of the first injection. The second total injection amount in the second injection can be estimated by integrating this transition of the injection rate. Since this second total injection amount is related with the duration to supply the command signal, the duration to supply the command signal can be set based on the second total injection amount. Here, in the second injection, the amount of lift of the needle is made larger than that in the first injection in order to obtain higher injection rate than in the first injection. In the case where the needle is on its way of going up at the endpoint of the first injection, the needle is kept going up and the process is shifted to the second injection. On the other hand, in the case where the needle is on its way of going down at the endpoint of the first injection, the needle is switched to go up from the start of the second injection. In this case, the injection rate will not rise right away, and will have a response delay. Here, the larger the rate of change of the fuel pressure, the smaller the rate of change of the injection rate. Note that when the rate of change of the fuel pressure is a positive value, the rate of change of the injection rate is a negative value. And, the smaller the change of rate of the injection rate, the larger the response delay before the injection rate starts rising. There is thus a correlation between the rate of change of the fuel pressure at the endpoint of the first injection and the response delay before the injection rate starts rising. Therefore, by determining the duration to supply the command signal according to this response delay, the second total injection amount in the second injection can be brought closer to its target value. In this way, excess or deficiency in the fuel injection amount can be prevented in the second injection that is a part of the boot-type injection. It is thus possible to prevent excess or deficiency in the fuel injection amount in the entire boot-type injection as well.

In addition, the controller may extend the duration to supply the command signal to the fuel injection valve in the second injection, with increasing rate of change of the fuel pressure at the endpoint of the first injection.

As described above, the larger the rate of change of the fuel pressure at the endpoint of the first injection, the larger the response delay before the injection rate starts rising. Therefore, by extending the duration to supply the command signal to the fuel injection valve longer, the duration to supply the command signal can be such a duration that accommodates the response delay of the injection rate.

Effect of the Invention

In accordance with the present invention, it is possible to prevent excess or deficiency in fuel injection amount during execution of so-called boot-type injection, in which fuel injection is executed with lowered injection rate and subsequently another fuel injection is executed with elevated injection rate.

BRIEF DESCRIPTION OF THE DRAWINGS

FIG. 1 is a diagram illustrating general configuration of an internal combustion engine in accordance with an embodiment;

FIG. 2 is a chart showing transition of injection rate during execution of boot-type injection;

FIG. 3 is a chart showing relationship between engine rotation speed, engine load, and region in which boot-type injection is performed;

FIG. 4 is a timing chart showing transitions of fuel pressure P in fuel injection valve, command signal to be supplied to the fuel injection valve, amount of lift of needle, and fuel injection rate dQ during executions of first and second injections;

FIG. 5 is a flowchart showing flow of fuel injection control in accordance with Embodiment 1;

FIG. 6 is a timing chart showing transitions of fuel pressure P in fuel injection valve, command signal to be supplied to the fuel injection valve, amount of lift of needle, and fuel injection rate during executions of first and second injections;

FIG. 7 is a flowchart showing flow of fuel injection control in accordance with Embodiment 2;

FIG. 8 is a timing chart showing transitions of fuel injection rate dQ, command signal, and amount of lift of needle;

FIG. 9 is a timing chart illustrating response delay of injection rate dQ;

FIG. 10 is a chart showing relationship between rate of change of fuel pressure P at starting point of second injection and amount of correction TB;

FIG. 11 is a timing chart showing transitions of fuel pressure P in fuel injection valve, command signal to be supplied to the fuel injection valve, amount of lift of needle, and fuel injection rate dQ in accordance with Embodiment 3; and FIG. 12 is another timing chart showing transitions of fuel pressure P in fuel injection valve, command signal to be supplied to the fuel injection valve, amount of lift of needle, and fuel injection rate dQ in accordance with Embodiment 3.

DESCRIPTION OF THE PREFERRED EMBODIMENTS

With reference to the drawings, modes for embodying this invention will be described below based on embodiments. However, note that dimensions, materials, geometries, and relative arrangements of components described in these embodiments are not intended to limit the scope of the invention thereto, unless otherwise stated.

Embodiment 1

FIG. 1 is a diagram illustrating general configuration of an internal combustion engine 1 in accordance with the present embodiment. In the present embodiment, some components are not shown for sake of simplicity in depicting the internal combustion engine 1. The internal combustion engine 1 is a diesel engine. The internal combustion engine 1 is mounted on, for example, a vehicle. A piston 3 is provided in a cylinder 2 of the internal combustion engine 1. A cavity 31, which hollows inwardly inside the piston, is formed on the upper surface of the piston 3.

The internal combustion engine 1 is provided with a fuel injection valve 4 for injecting fuel directly into the cylinder 2. The fuel injection valve 4 is connected to a common rail 5, which is in turn in communication with a fuel pump 7 via a fuel supply conduit 6. The fuel injection valve 4 is provided with a pressure-regulating mechanism 8, by which pressure of fuel is regulated. Note that instead of using the pressure-regulating mechanism 8, the pressure of fuel may alternatively be regulated by changing compressibility of fuel in the fuel pump 7. Further alternatively, a mechanism for regulating the pressure of fuel may be provided on the common rail 5, thereby regulating the pressure of fuel at the common rail 5. These configurations for regulation of fuel pressure are well-known and thus are not described herein.

The fuel injection valve 4 is equipped with a needle 42 for opening and closing a fuel passage leading to an injection hole 41, and a valve-operating mechanism 43 for moving the needle 42 up and down. The valve-operating mechanism 43 is equipped with, for example, a piezoelectric element, and powering this piezoelectric element allows the needle 42 to go up in a valve-opening direction. A fuel pressure sensor 44 is attached to the fuel injection valve 4 for detecting pressure of fuel within the fuel injection valve 4. The fuel pressure sensor 44 is for detecting the pressure of fuel to be injected from the fuel injection valve 4, and is not for detecting the pressure of fuel for driving the needle 42.

Along with the internal combustion engine 1 configured as described hereinabove, an ECU 10, which is an electronic control unit for controlling the internal combustion engine 1, is also provided. This ECU 10 controls the internal combustion engine 1 according to operational condition of the internal combustion engine 1, request from a driver, and the like. An accelerator opening sensor 17, which is for outputting electric signal according to amount of an accelerator pedal 16 that the driver has pressed and for detecting engine load, and a crank position sensor 18, which is for detecting engine rotation speed, are connected to the ECU 10, and signals output from these various sensors are input into the ECU 10. Note that in the present embodiment, the accelerator opening sensor 17 and the crank position sensor 18 correspond to the operational state detector in the present invention.

On the other hand, the pressure-regulating mechanism 8 and the valve-operating mechanism 43 are connected to the ECU 10 via electric lines, and are controlled by the ECU 10. Note that although it is the valve-driving mechanism 43 of the fuel injection valve 4 that is being controlled by the ECU 10, however, hereinafter, the ECU 10 is referred to as controlling the fuel injection valve 4. In response to supply of command signal from the ECU 10 to the fuel injection valve 4, the needle 42 goes up and thus is moved in the valve-opening direction. On the other hand, once supply of the command signal from the ECU 10 to the fuel injection valve 4 is stopped, the needle 42 goes down and thus is moved in a valve-closing direction. Note that in the present embodiment, the ECU 10 corresponds to the controller in the present invention.

The ECU 10 determines amount and timing of fuel injection from the fuel injection valve 4, and pressure of fuel, based on operational state (engine rotation speed and accelerator opening, for example) of the internal combustion engine 1. Note that relationship between the operational state of the internal combustion engine 1, the amount and timing of fuel injection from the fuel injection valve 4, and the pressure of fuel is previously determined and made into a map via experiment or the like and is stored in the ECU 10. This map is set such that air-fuel ratio in the cylinder becomes a target air-fuel ratio, which is an air-fuel ratio that is set according to the operational state (engine rotation speed and accelerator opening, for example) of the internal combustion engine 1.

The ECU 10 executes boot-type injection when the internal combustion engine 1 is in its middle-load operation region or high-load operation region. Here, FIG. 2 is a chart showing transition of injection rate (injection amount per unit time) during execution of boot-type injection. In the boot-type injection, first injection is executed with lowered injection rate and subsequently second injection is executed with injection rate higher than that in the first injection. In FIG. 2, Q1 represents first injection amount that is a target value for total fuel injection amount in the first injection; Q2 represents second injection amount that is a target value for total fuel injection amount in the second injection; dQ1 represents a target value for injection rate in the first injection; T1 represents duration to perform the first injection (first injection duration); and T2 represents duration to perform the second injection (second injection duration). TX is a point of time at which the first injection ends and the second injection starts, at which the injection rate starts rising from dQ1. Note that in FIG. 2, the first injection duration T1 is shown in three patterns. Furthermore, FIG. 3 is a chart showing relationship between engine rotation speed, engine load, and region in which the boot-type injection is performed. In the present embodiment, the boot-type injection is performed in regions shown as middle-load and high-load in FIG. 3. This boot-type injection may also be set to be performed when at least one of the engine load and the engine rotation speed is not less than moderate.

Here, higher engine load results in more fuel injection. This leads to the higher pressure within the cylinder 2, which in turn may cause easier generation of NOx and larger combustion noise. Although abrupt rise of the pressure within the cylinder 2 can be restrained by performing the first injection, however, the first injection amount Q1 is required to be larger as the engine load gets higher. Here, the first injection amount Q1 can be made larger by at least increasing the target value dQ1 for the injection rate dQ in the first injection larger or extending the first injection duration T1. However, if the target value dQ1 for the injection rate dQ in the first injection is too large, it may result in abrupt rise of the pressure, so that the target value dQ1 for the injection rate dQ in the first injection cannot be made too large. On the other hand, the longer first injection duration T1 can result in the larger first injection amount Q1 and also the slower rise of the pressure within the cylinder 2, so that combustion noise can be reduced. Similarly, exhaustion of NOx can also be reduced. In this way, the ECU 10 regulates either the target value dQ1 for the injection rate dQ in the first injection or the first injection duration T1, according to the operational state of the internal combustion engine 1.

FIG. 4 is a timing chart showing transitions of fuel pressure P in the fuel injection valve 4, command signal to be supplied to the fuel injection valve 4, amount of lift of the needle 42, and the fuel injection rate dQ, during executions of the first and second injections. In FIG. 4, dP1 is a target value for the amount that the pressure of fuel has dropped since starting point of the first injection (fuel pressure drop amount dP).

The needle 42 goes up in response to supply of command signal from the ECU 10 to the fuel injection valve 4. There is an upper limit provided to the amount of lift of the needle, and the amount of lift of the needle continues increasing with duration of command signal supply, until the upper limit is reached. As long as the amount of lift of the needle 42 has not yet reached the upper limit, the larger the amount of lift of the needle 42, the larger the injection rate dQ, and the smaller the fuel pressure P.

Here, in the first injection duration T1, the injection rate dQ in the first injection may occasionally be larger than the target value dQ1. Therefore, in the first injection, a need may arise to supply the command signal such that the injection rate dQ becomes the target value dQ1. At this time, in the present embodiment, the command signal is supplied in such a way that brings the fuel pressure drop amount dP closer the target value dP1. Specifically, supply of the command signal is stopped when the fuel pressure drop amount dP becomes larger than the target value dP1 (that is, the pressure P drops below the line of dP1 in FIG. 4), and the command signal is supplied when the fuel pressure drop amount dP becomes smaller than the target value dP1 (that is, the pressure P rises above the line of dP1 in FIG. 4).

Here, the fuel pressure drop amount dP has a high correlation with the injection rate dQ. That is, increase in the fuel pressure drop amount dP means that more fuel has been injected per unit time, which indicates that the injection rate dQ is large. Therefore, the injection rate dQ can be brought closer to the target value dQ1 by bringing the fuel pressure drop amount dP closer to the target value dP1. That is, once the first injection is started and the command signal is supplied to the fuel injection valve 4, the amount of lift of the needle 42 increases with the duration of command signal supply. This leads to expansion of cross-sectional area of the fuel passage in the fuel injection valve 4, and thus results in increase in the injection rate dQ of fuel. Furthermore, the pressure P within the fuel injection valve 4 decreases as the injection of fuel proceeds. Since there is a high correlation between the fuel pressure drop amount dP and the injection rate dQ as mentioned above, the fuel pressure drop amount dP of the time the injection rate dQ becomes the target value dQ1 can be obtained, and by setting the fuel pressure drop amount dP of this time as the target value dP1, it becomes possible to control the injection rate dQ based on the fuel pressure drop amount dP. The fuel pressure drop amount dP can be obtained by subtracting the fuel pressure P detected by the fuel pressure sensor 44 at the current point of time from the fuel pressure P detected by the fuel pressure sensor 44 at the starting point of the first injection. Since the target value dQ1 for the injection rate dQ is related with the operational state of the internal combustion engine 1, the target value dP1 for the fuel pressure drop amount dP is also related with the operational state of the internal combustion engine 1. Therefore, the target value dP1 for the fuel pressure drop amount dP can be set based on the operational state of the internal combustion engine 1. Note that since the first injection amount Q1 can be regulated by the first injection duration T1, the target value dQ1 for the injection rate dQ and the target value dP1 for the fuel pressure drop amount dP can be set independently from the first injection amount Q1.

In addition, in the present embodiment, once the first injection is started, a total amount of fuel injection in the first injection (first total injection amount) is calculated by integrating the injection rate dQ. Here, the total amount of fuel injected since the starting point of the first injection can be calculated by integrating the injection rate dQ since the starting point of the first injection. Then, once the total amount of fuel injection in the first injection has reached the first injection amount Q1, the first injection is terminated and the second injection is started.

The specific procedures for control are now described. FIG. 5 is a flowchart showing flow of fuel injection control in accordance with the present embodiment. The present flowchart is performed by the ECU 10 per combustion cycle.

In step S101, operational state of the internal combustion engine 1 is detected. In this step, engine rotation speed NE and injection amount requirement Q0 are detected. The injection amount requirement Q0 is obtained based on accelerator opening. The injection amount requirement Q0 is sum of first injection amount Q1 and second injection amount Q2, and is an amount of fuel injection required for generation of necessary torques. Relationship between the injection amount requirement Q0 and the accelerator opening is previously determined via experiment, simulation, or the like and is stored in the ECU 10.

In step S102, it is determined whether or not boot-type injection is required. In this step, it is determined whether or not the internal combustion engine 1 is being operated in operation region that requires boot-type injection, based on the engine rotation speed NE and the injection amount requirement Q0. Relationship between the engine rotation speed NE, the injection amount requirement Q0, and the operation region that requires boot-type injection is previously determined via experiment, simulation, or the like and is stored in the ECU 10. If it was determined YES in Step S102, the process proceeds to Step S103; whereas if it was determined NO, the present flowchart is ended.

In Step S103, a target value dQ1 for injection rate dQ in first injection, a first injection amount Q1, a second injection amount Q2, a target value dP1 for fuel pressure drop amount dP are calculated. There is no particular limitation to how to calculate the target value dQ1 for the injection rate dQ in the first injection, the first injection amount Q1, the second injection amount Q2, and the target value dP1 for the fuel pressure drop amount dP and thus any well-known technique can be employed, however, the values and amounts can be calculated as below, for example. The target value dQ1 for the injection rate dQ in the first injection and the first injection amount Q1 are calculated based on the engine rotation speed NE, the injection amount requirement Q0, and fuel pressure PCR. The fuel pressure PCR is an amount of pressure before fuel injection, and can be considered as fuel pressure at starting point of the first injection. The target value dQ1 for the injection rate dQ in the first injection and the first injection amount Q1 are set such that combustion noise and NOx can be reduced, and also in consideration of amount of smoke generated, since more smoke may sometimes be generated. Relationship of the target value dQ1 for the injection rate dQ in the first injection and the first injection amount Q1 with the engine rotation speed NE, the injection amount requirement Q0, and the fuel pressure PCR can be previously obtained via experiment, simulation, or the like. The second injection amount Q2 is calculated by subtracting the first injection amount Q1 from the injection amount requirement Q0. The target value dP1 for the fuel pressure drop amount dP is calculated based on the engine rotation speed NE, the fuel pressure PCR, and the target value dQ1 for the injection rate dQ in the first injection. That is, the target value dP1 for the fuel pressure drop amount dP is set as a value at which the target value dQ1 for the injection rate dQ in the first injection is achieved under the current operational state of the internal combustion engine 1. Relationship of the target value dP1 for the fuel pressure drop amount dP with the engine rotation speed NE, the fuel pressure PCR, and the target value dQ1 for the injection rate dQ in the first injection can be previously obtained via experiment, simulation, or the like.

In step S104, the first injection is started. That is, a command signal is supplied to the fuel injection valve 4.

In Step S105, injection amount Q is calculated. The injection amount Q is a total amount of fuel injection since the starting point of the first injection, and is obtained by integrating the injection rate dQ. Since the injection rate dQ is in correlation with the fuel pressure drop amount dP, the injection amount Q is calculated by integrating the injection rate dQ that is calculated based on the fuel pressure drop amount dP.

In Step S106, it is determined whether or not the injection amount Q is greater than or equal to the first injection amount Q1. In this Step S106, it is determined whether or not the time has come to end the first injection. If it is determined YES in Step S106, the process proceeds to Step S107.

In Step S107, the second injection is started as the first injection is ended. In Step S108, duration of command signal supply TA in the second injection is calculated. Although in the present embodiment, there is no particular limitation to how to calculate the duration of command signal supply TA in the second injection, and thus any well-known technique can be employed, however, the method for calculation which will be described in Embodiment 2, for example, can be employed as well.

In Step S109, it is determined whether or not elapse period T since the starting point of the second injection is greater than or equal to the duration of command signal supply TA in the second injection. In the present Step S109, it is determined whether or not the time has come to stop the supply of the command signal. If it is determined NO in Step S109, the Step S109 is performed again. That is, the second injection continues until the elapse period T since the starting point of the second injection becomes not less than the duration of command signal supply TA in the second injection. On the other hand, if it was determined YES in Step S109, the process proceeds to Step S110, where the second injection is ended and thereafter the present flowchart is ended.

On the other hand, if it was determined NO in Step S106, the process proceeds to Step S111. In Step S111, it is determined whether or not the fuel pressure drop amount dP is greater than the target value dP1. In the present Step S111, it is determined whether or not the pressure of fuel has become too low such that the injection rate dQ drops below the target value dQ1. Therefore, if it was determined YES in Step S111, the process proceeds to Step S112 and the supply of command signal is stopped in order to decrease the fuel pressure drop amount dP (that is, increase the fuel pressure P). In Step S112, if there has been no command signal being supplied before then, the state with no command signal is maintained; whereas if there has been a command signal being supplied, the supply of command signal is stopped. Then, once the processing of Step S112 ends, the process returns to Step 105. On the other hand, if it was determined NO in Step S111, the process proceeds to Step S113.

In Step S113, it is determined whether or not the fuel pressure drop amount dP is less than the target value dP1. In the present Step S113, it is determined whether or not the pressure of fuel has become too high such that the injection rate dQ rises above the target value dQ1. If it was determined YES in Step S113, the process proceeds to Step S114 and the command signal is supplied in order to increase the fuel pressure drop amount dP (that is, decrease the fuel pressure P). In Step S114, if there has been no command signal being supplied before then, the supply of command signal is started; whereas if there has been a command signal being supplied, the supply of command signal is continued. Then, once the processing of Step S114 ends, the process returns to Step 105. On the other hand, if it was determined NO in Step S113, it is the case where the fuel pressure drop amount dP is equal to the target value dP1. Therefore, the state of the supply of command signal is not changed and the process returns to Step S105.

Therefore, the supply of command signal is switched on and off in such a way that beings the fuel pressure drop amount dP closer to the target value dP1, until it is determined YES in Step S106. In this way, the fuel injection valve 4 is operated by the ECU 10 in such away that beings the injection rate dQ closer to the target value dQ1.

In accordance with the present embodiment described hereinabove, by supplying the command signal in such a way that brings the injection rate dQ in the first injection closer to the target value dQ1, the fuel injection rate dQ in the first injection can be adjusted to the target value dQ1 and the fuel injection amount Q can be adjusted to its target value (i.e., the first injection amount Q1). In this way, the injection rate dQ can be regulated with precision while the first injection that is a part of the boot-type injection is being performed, so that excess or deficiency in the fuel injection amount can be prevented in that part of the boot-type injection. It is thus possible to prevent excess or deficiency in the fuel injection amount in the entire boot-type injection as well. In addition, greater degree of freedom can be offered in regulation of combustion speed during initial combustion, so that combustion noise and NOx exhaustion can be reduced. In addition, amount of smoke generated can also be reduced, so that deterioration of fuel economy can be prevented. Furthermore, since the conventional type of fuel injection valve can be employed, cost reduction can also be accomplished.

Embodiment 2

In the present embodiment, the second injection is described. Other factors such as the devices are similar to those in Embodiment 1 are not described here. As described in Embodiment 1, the second injection is started once the injection amount Q since the start of the first injection has reached the first injection amount Q1. Here, at the start of the second injection, there may be a command signal being supplied or there may be no command signal being supplied. That is, the needle 42 may be on its way of going up or may be on its way of going down. The speed of the needle 42 at the end of the first injection may also be different depending on the timing at which the first injection ends.

In the second injection, the amount of lift of the needle 42 is made larger than that at the endpoint of the first injection in order to increase the injection rate dQ from the rate in the first injection. For this reason, the supply of command signal is continued for a predetermined duration since the endpoint of the first injection. When the needle 42 is on its way of going up at the endpoint of the first injection, the higher the speed of the needle 42 is at that time in the upward direction, the faster the needle 42 goes up in the second injection, and thus the faster the injection rate dQ rises. On the other hand, when the needle 42 is on its way of going down at the endpoint of the first injection, then the higher the speed of the needle 42 is at that time in the downward direction, the more the time is required for the needle 42 to start going up in the second direction, and thus the more the time is required for the injection rate dQ to start rising. That is, in some cases, the injection rate dQ may start rising immediately after the starting point of the second injection; whereas in other cases, time may be required before the injection rate dQ starts rising. As such, depending on the state of the needle 42 at the endpoint of the first injection, there may be some response delay before the injection rates dQ starts increasing. Furthermore, since the amount of lift of the needle 42 is continually changing during execution of the first injection, the amount of lift of the needle 42 at the start of the second injection may be different each time. Because the amount of lift of the needle 42 has influence on the injection rate dQ, the total amount of fuel injection in the second injection (second total injection amount) may be different depending on the amount of lift of the needle 42 at the starting point of the second injection, even if the duration of fuel injection is the same.

Here, FIG. 6 is a timing chart showing transitions of the fuel pressure P in the fuel injection valve 4, the command signal to be supplied to the fuel injection valve 4, the amount of lift of the needle 42, and the fuel injection rate dQ, during executions of the first and second injections. As shown in FIG. 6, the injection rate dQ in the second injection may rise in many patterns, which may be different depending on the situation at the starting point of the second injection. The earlier the timing of the injection rate dQ to start rising is after the start of the second injection, the shorter the duration of command signal supply TA may be in the second injection. Note that in FIG. 6, the shortest duration of command signal supply is indicated as TA1, and gets longer in the order of TA2, and TA3.

The response delay of the injection rate dQ is in correlation with rate of change of the fuel pressure P ("slope" in FIG. 6) at the starting point of the second injection. That is, the larger the rate of change of the fuel pressure P, the larger the rate of increase of the fuel pressure P, and thus the smaller the rate of change of the injection rate dQ. Note that the rate of change of the fuel pressure P is a negative value when the fuel pressure P is decreasing. Similarly, the rate of change of the injection rate dQ is also a negative value when the rate of injection dQ is decreasing. The smaller the rate of change of the injection rate dQ, the more the time required for the injection rate dQ to start rising, and thus the larger the response delay.

In the present embodiment, the target value for the first total injection amount in the first injection and the target value for the second total injection amount in the second injection are set based on the operational state of the internal combustion engine 1, and further, the duration to supply the command signal to the fuel injection valve 4 in the second injection is set based on the amount of lift of the needle 42 at the endpoint of the first injection, the target value for the second total injection amount in the second injection, and the rate of change of the fuel pressure P at the endpoint of the first injection that is calculated based on the fuel pressure detected by the fuel pressure sensor 44.

FIG. 7 is a flowchart showing flow of fuel injection control in accordance with the present embodiment. The present flowchart is performed by the ECU 10 per combustion cycle. Note that the processing before Step S107 are same as those in the flowchart shown in FIG. 5, and thus neither shown nor described here. In addition, the steps that execute the same processing as those in the flowchart shown in FIG. 5 are indicated by the same numerals and are not described here.

In the flowchart shown in FIG. 7, the process proceeds to Step S201 after the processing in Step S107. In Step S201, the amount of needle lifted L at the starting point of the second injection is estimated. This amount of needle lifted L is calculated based on the fuel pressure drop amount dP as below. First, the injection rate dQ is calculated from the fuel pressure drop amount dP. Since there is a correlation between the fuel pressure drop amount dP and the injection rate dQ, the injection rate dQ can be calculated from the fuel pressure drop amount dP by using this correlation. Since this injection rate dQ is in correlation with the cross-sectional area of the fuel passage within the fuel injection valve 4, the cross-sectional area of the fuel passage can be calculated based on the injection rate dQ. Further, since there is a correlation between the cross-sectional area of the fuel passage and the amount of needle lifted L, the amount of needle lifted L can be calculated based on the cross-sectional area of the fuel passage. By previously obtaining a formula for calculating the amount of needle lifted L from the fuel pressure drop amount dP and storing it in the ECU 10, it is possible to calculate the amount of needle lifted L from the fuel pressure drop amount dP.

In Step S202, the duration of command signal supply TA is calculated based on the amount of needle lifted L at the starting point of the second injection and the second injection amount Q2. At this time, the duration of command signal supply TA is calculated on an assumption that the second injection was started when the needle 42 was on its way of going up. Here, FIG. 8 is a timing chart showing transitions of the fuel injection rate dQ, the command signal, and the amount of needle lifted. In FIG. 8, the needle 42 is on its way of going up at the endpoint of the first injection or the starting point of the second injection. The supply of command signal is thus continued during the transition from the first injection to the second injection. The injection rate dQ thereafter is influenced by the amount of needle lifted L at the starting point of the second injection. Therefore, the transition of the injection rate dQ while the needle 42 is going up is determined based on the amount of needle lifted L at the starting point of the second injection. Since the transition of the amount of needle lifted can be obtained in advance via experiment, simulation, or the like, the transition of the amount of needle lifted after the starting point of the second injection can be obtained from the amount of needle lifted L at that point of time. Furthermore, the transition of the injection rate dQ can also be obtained, because the injection rate dQ changes according to the amount of needle lifted. Similarly, based on the amount of needle lifted at the point of time when the supply of command signal was stopped, the transition of the amount of needle lifted from that point of time can be obtained, and thus the transition of the injection rate dQ can also be obtained. Therefore, the duration of command signal supply TA can be obtained such that the total sum of the amount of fuel injected for the duration of command signal supply TA since the starting point of the second injection and the amount of fuel injected since the point of time when the supply of command signal was stopped is equal to the second injection amount Q2.

In step S203, amount of correction TB for the duration of command signal supply TA is calculated by taking into account the response delay of the injection rate dQ from the start of the supply of command signal for the second injection. FIG. 9 is a timing chart illustrating the response delay of the injection rate dQ. When the injection rate dQ is on its way of dropping, the slope of the injection rate dQ is a negative value, and the smaller the slope, the larger the response delay. And, there is a correlation between the slope of the injection rate dQ and the rate of change of the fuel pressure P (the slope of the fuel pressure P). The amount of correction TB can thus be calculated based on the rate of change of the fuel pressure P.

Here, FIG. 10 is a chart showing relationship between the rate of change of the fuel pressure P at the starting point of the second injection and the amount of correction TB. As shown, there is a correlation between the rate of change of the fuel pressure P and the amount of correction TB. Note that when the needle 42 is on its way of going up, the rate of change of the fuel pressure P is a negative value; whereas when the needle 42 is on its way of going down, the rate of change of the fuel pressure P is a positive value. The larger the rate of change of the fuel pressure P, the smaller the slope of the injection rate dQ, and thus the larger the response delay, as shown in FIG. 9. Therefore, as shown in FIG. 10, the larger the rate of change of the fuel pressure is, the larger the amount of correction TB is set to extend the duration of command signal supply. Note that the relationship shown in FIG. 10 is previously obtained via experiment, simulation, or the like and stored in the ECU 10.

In Step S204, the amount of correction TB calculated in Step S203 is added to the duration of command signal supply TA calculated in Step S202 to correct the duration of command signal TA. Thereafter, the process proceeds to Step S109.

Note that the amount of fuel actually injected during the second injection (actual fuel injection amount) can be calculated by integrating the fuel pressure drop amount dP in the second injection. This actual fuel injection amount can be compared against the second injection amount Q2 to obtain any deviation of the actual fuel injection amount from the second injection amount Q2. For example, by correcting the amount of correction TB based on the difference between the second fuel injection amount Q2 and the actual fuel injection amount, the actual fuel injection amount in the next second fuel injection can be brought further closer to the second injection amount Q2.

In accordance with the present embodiment as described hereinabove, the fuel injection amount in the second injection can be adjusted to its target value (i.e., the second injection amount Q2) with precision. In this way, excess or deficiency in the fuel injection amount can be prevented in the second injection that is a part of the boot-type injection. It is thus possible to prevent excess or deficiency in the fuel injection amount in the entire boot-type injection as well.

Embodiment 3

In the present embodiment, another aspect of the boot-type injection is described. FIG. 11 is a timing chart showing transitions of the fuel pressure P in the fuel injection valve 4, the command signal to be supplied to the fuel injection valve 4, the amount of lift of the needle 42, and the fuel injection rate dQ in accordance with the present embodiment. In the boot-type injection shown in FIG. 11, first, second, and third injections are performed. Durations to perform the first, second, and third injections are referred to as first injection duration T1, second injection duration T2, and third injection duration T3, respectively. Furthermore, target values for amounts of fuel injection in the first, second, and third injections are referred to as first injection amount Q1, second injection amount Q2, and third injection amount Q3, respectively. Values indicated as dP1 and dP2 are target values for fuel pressure drop amounts dP since starting point of the first injection, where dP1 represents target value in the first injection and dP2 represent target value in the second injection. That is, the target values for the fuel pressure drop amounts are changed between the first injection and the second injection. In this way, target values for injection rates can also be changed between the first injection and the second injection.

FIG. 12 is another timing chart showing transitions of the fuel pressure P in the fuel injection valve 4, the command signal to be supplied to the fuel injection valve 4, the amount of lift of the needle 42, and the fuel injection rate dQ in accordance with the present embodiment. In the boot-type injection shown in FIG. 12, the target value dP1 for the fuel pressure drop amount dP during the first injection is increased gradually. The fuel pressure is therefore decreased gradually. Accordingly, the injection rate dQ in the first injection is increased gradually. In this way, the injection rate in the first injection duration can be varied.

DESCRIPTION OF SYMBOLS 1 internal combustion engine
2 cylinder
3 piston
4 fuel injection valve
5 common rail
6 fuel supply conduit
7 fuel pump
8 pressure-regulating mechanism
10 ECU
17 accelerator opening sensor
18 crank position sensor
31 cavity
41 injection hole 42 needle
43 valve-driving mechanism
44 fuel pressure sensor

What is claimed is:

1. An internal combustion engine comprising:
a fuel injection valve in which, in response to supply of command signal, a needle is urged in a valve-opening direction and thereby cross-sectional area of a fuel passage is expanded and injection rate of fuel is increased according to amount of lift of the needle, the fuel injection valve having a sensor for detecting pressure of fuel within the fuel injection valve;
a controller comprising at least one processor configured to supply the command signal to the fuel injection valve, the controller comprising at least one processor configured to perform first injection that executes fuel injection from the fuel injection valve and subsequently comprising at least one processor configured to perform second injection that executes fuel injection from the fuel injection valve with injection rate higher than that in the first injection;
an operational state detector configured to detect operational state of the internal combustion engine,
wherein the controller comprises at least one processor configured to determine, based on the operational state of the internal combustion engine detected by the operational state detector, a target value for fuel pressure drop amount or difference between the pressure of fuel detected by the sensor at starting point of the first injection and the pressure of fuel detected by the sensor while the first injection is performed, and during execution of the first injection, stop supply of the command signal to the fuel injection valve once the fuel pressure drop amount becomes greater than the target value for the fuel pressure drop amount, and supply the command signal once the fuel pressure drop amount becomes smaller than the target value for the fuel pressure drop amount, and
wherein the controller comprises at least one processor configured to set a target value for second total injection amount or total amount of fuel injection in the second injection, based on the operational state of the internal combustion engine detected by the operational state detector, and calculate duration to supply the command signal to the fuel injection valve in the second injection, based on the amount of lift of the needle determined at endpoint of the first injection, the target value for the second total injection amount in the second injection, and rate of change of the pressure of fuel at the endpoint of the first injection that is calculated based on the pressure of fuel detected by the sensor.

2. The internal combustion engine of claim 1, wherein
the controller comprises at least one processor configured to set a target value for first total injection amount or total amount of fuel injection in the first injection, based on the operational state of the internal combustion engine detected by the operational state detector, calculate the injection rate of fuel based on the fuel pressure drop amount while the first injection is being performed, calculate the first total injection amount since the starting point of the first injection by integrating the injection rate, and perform the second injection after the first injection once the first total injection amount reaches the target value for the first total injection amount.

3. The internal combustion engine of claim 1, wherein
the controller comprises at least one processor configured to extend the duration to supply the command signal to the fuel injection valve in the second injection, with increasing rate of change of the fuel pressure at the endpoint of the first injection.

* * * * *